US011783578B2

(12) United States Patent
Berg et al.

(10) Patent No.: US 11,783,578 B2
(45) Date of Patent: *Oct. 10, 2023

(54) MACHINE LEARNING METHODS AND SYSTEMS FOR VARIETY PROFILE INDEX CROP CHARACTERIZATION

(71) Applicant: ADVANCED AGRILYTICS HOLDINGS, LLC, Indianapolis, IN (US)

(72) Inventors: William Kess Berg, Clayton, IN (US); Jon J. Fridgen, Lancaster, KY (US); Jonathan Michael Bokmeyer, Zionsville, IN (US); Andrew James Woodyard, Champaign, IL (US)

(73) Assignee: ADVANCED AGRILYTICS HOLDINGS, LLC, Indianapolis, IN (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/088,259

(22) Filed: Dec. 23, 2022

(65) Prior Publication Data

US 2023/0126363 A1  Apr. 27, 2023

Related U.S. Application Data

(63) Continuation of application No. 17/694,661, filed on Mar. 14, 2022, now Pat. No. 11,574,466.

(Continued)

(51) Int. Cl.
*G06V 20/10* (2022.01)
*G06N 20/00* (2019.01)
(Continued)

(52) U.S. Cl.
CPC .......... *G06V 20/188* (2022.01); *A01B 79/005* (2013.01); *G06F 18/2155* (2023.01); *G06N 20/00* (2019.01)

(58) Field of Classification Search
CPC .. A01B 79/005; G06F 18/2155; G06N 20/00; G06V 20/188
See application file for complete search history.

(56) References Cited

U.S. PATENT DOCUMENTS

| 2016/0272987 A1 | 9/2016 | Gil et al. |
| 2019/0108631 A1 | 4/2019 | Riley et al. |
| 2021/0027056 A1* | 1/2021 | Koch ................... G06F 18/214 |

OTHER PUBLICATIONS

Lu, Wei, et al. "Soybean Yield Preharvest Prediction Based on Bean Pods and Leaves Image Recognition Using Deep Learning Neural Network Combined With GRNN." Frontiers in Plant Science 12 (2022): 791256 . (Year: 2022).*

(Continued)

*Primary Examiner* — Vu Le
*Assistant Examiner* — Tracy Mangialaschi
(74) *Attorney, Agent, or Firm* — MARSHALL, GERSTEIN & BORUN LLP; Randall G. Rueth

(57) ABSTRACT

A system includes one or more processors; and one or more non-transitory, computer-readable media including instructions that, when executed by the one or more processors, cause the computing system to: receive a machine data set; process the machine data set with a trained machine-learned model to generate predicted variety profile index values; and cause a visualization to be displayed. A computer-implemented method includes receiving a machine data set; processing the machine data set with a trained machine-learned model to generate predicted variety profile index values; and causing a visualization to be displayed. A non-transitory computer-readable medium includes computer-executable instructions that, when executed by one or more processors, cause a computer to: receive a machine data set; process the machine data set with a trained machine-learned model to generate predicted variety profile index values; and cause a visualization to be displayed.

20 Claims, 11 Drawing Sheets

Related U.S. Application Data

(60) Provisional application No. 63/174,386, filed on Apr. 13, 2021.

(51) Int. Cl.
*A01B 79/00* (2006.01)
*G06F 18/214* (2023.01)

(56) References Cited

OTHER PUBLICATIONS

Alves, Guiliano Rangel, et al. "Estimating soybean yields with artificial neural networks." Acta Scientiarum. Agronomy 40 (2018). (Year: 2018).

Eugenio, Fernando Coelho, et al. "Estimation of soybean yield from machine learning techniques and multispectral RPAS imagery." Remote Sensing Applications: Society and Environment 20 (2020): 100397. (Year: 2020).

Sundaramoorthi, Durai, and Lingxiu Dong. "Machine-learning-based simulation for estimating parameters in portfolio optimization: empirical application to soybean variety selection." Available at SSRN 3412648 (2019). (Year: 2019).

U.S. Appl. No. 17/694,661, Machine Learning Methods and Systems for Variety Profile Index Crop Characterization, filed Mar. 14, 2022.

Zhou J, Zhou J, Ye H, Ali ML, Chen P, Nguyen HT. Yield estimation of soybean breeding lines under drought stress using unmanned aerial vehicle-based imagery and convolutional neural network. Biosystems Engineering. Feb. 3, 2021;204:90-103. (Year: 2021).

International Application No. PCT/US2022/020632, International Search Report and Written Opinion, dated Jun. 24, 2022.

Liakos et al., "Machine Learning in Agriculture: A Review", Sensors, vol. 18, No. 8, (2018).

* cited by examiner

MACHINE LEARNING METHODS AND SYSTEMS FOR VARIETY PROFILE INDEX CROP CHARACTERIZATION

CROSS-REFERENCE TO RELATED APPLICATIONS

This application is a continuation of U.S. patent application Ser. No. 17/694,661, entitled MACHINE LEARNING METHODS AND SYSTEMS FOR VARIETY PROFILE INDEX CROP CHARACTERIZATION, filed on Mar. 14, 2022, which claims the benefit of U.S. Provisional Application 63/174,386, filed Apr. 13, 2021, and entitled MACHINE LEARNING METHODS AND SYSTEMS FOR VARIETY PROFILE INDEX CROP CHARACTERIZATION. The foregoing are incorporated herein by reference in their entireties.

TECHNICAL FIELD

The present disclosure is generally directed to methods and systems for characterizing soybeans, and more specifically, for generating field management recommendations based on one or more determined soybean characteristics within a field and/or sub-field.

BACKGROUND

Growers and trusted advisors struggle to gain an understanding of the growing behavior of soybeans in agricultural fields. Conventionally used soybean characteristics, such as tall, bushy, etc., are subjective and do not lend themselves to analysis when trying to understand which soybean varieties will grow well in which fields and under which growing conditions. Thus, growers and trusted advisors are often unsure which soybean variety to plant, a consideration only complicated by the variability among different agricultural fields.

Further, conventional techniques for characterizing soybeans may require intensive manual labor of many individuals (e.g., one hundred or more) for a single field. Such techniques may include extensive delays of time related to crop sample preparation (e.g., manual threshing, drying, weighing, etc.) in addition to machinery for collection, and storage facilities for storage.

Still further, the subjective nature of recommendations regarding field varieties and planting is conventionally based on grower intuition, anecdote, and other unreliable and unreproducible information. Field managers, trusted advisors and seed companies are unable to quantify performance of varieties, and thus, are unable to compare performance when making recommendations.

BRIEF SUMMARY

In one aspect, a computing system for training a machine learning model to characterize soybean plants includes one or more processors; and one or more non-transitory, computer-readable media including instructions that, when executed by the one or more processors, cause the computing system to: (i) receive a machine data set corresponding to an agricultural field; (ii) process the machine data set with a trained machine-learned model to generate one or more predicted variety profile index values, the trained machine-learned model trained using labeled data including a ratio of at least one measured branch bean weight to at least one measured stem bean weight; and (iii) cause a visualization based on the predicted variety profile index values to be displayed on a graphical user interface of a computing device.

In another aspect, a computer-implemented method for training a machine learning model to characterize soybean plants includes (i) receiving a machine data set corresponding to an agricultural field; (ii) processing the machine data set with a trained machine-learned model to generate one or more predicted variety profile index values, the trained machine-learned model trained using labeled data including a ratio of at least one measured branch bean weight to at least one measured stem bean weight; and (iii) causing a visualization based on the predicted variety profile index values to be displayed on a graphical user interface of a computing device.

In yet another aspect, a non-transitory computer-readable medium having stored thereon computer-executable instructions that, when executed by one or more processors, cause a computer to: (i) receive a machine data set corresponding to an agricultural field; (ii) process the machine data set with a trained machine-learned model to generate one or more predicted variety profile index values, the trained machine-learned model trained using labeled data including a ratio of at least one measured branch bean weight to at least one measured stem bean weight; and (iii) cause a visualization based on the predicted variety profile index values to be displayed on a graphical user interface of a computing device.

BRIEF DESCRIPTION OF THE FIGURES

The figures described below depict various aspects of the system and methods disclosed therein. It should be understood that each figure depicts one embodiment of a particular aspect of the disclosed system and methods, and that each of the figures is intended to accord with a possible embodiment thereof. Further, wherever possible, the following description refers to the reference numerals included in the following figures, in which features depicted in multiple figures are designated with consistent reference numerals.

The figures depict preferred embodiments for purposes of illustration only. One of ordinary skill in the art will readily recognize from the following discussion that alternative embodiments of the systems and methods illustrated herein may be employed without departing from the principles of the invention described herein.

DETAILED DESCRIPTION

Overview

The present disclosure is generally directed to methods and systems for characterizing soybeans, and more specifically, for generating field management recommendations based on one or more determined soybean characteristics within a field and/or sub-field.

Disclosed techniques advantageously improve the ability of individuals and organizations (e.g., a grower, a trusted advisor, a seed company, etc.) that own and/or manage agricultural fields to objectively measure soybean plant growth in those agricultural fields, both at the field and sub-field level. In particular, the present techniques may determine growth structures of soybean plants to objectively analyze and inform management decisions and/or to assist in product placement.

Figure 1:
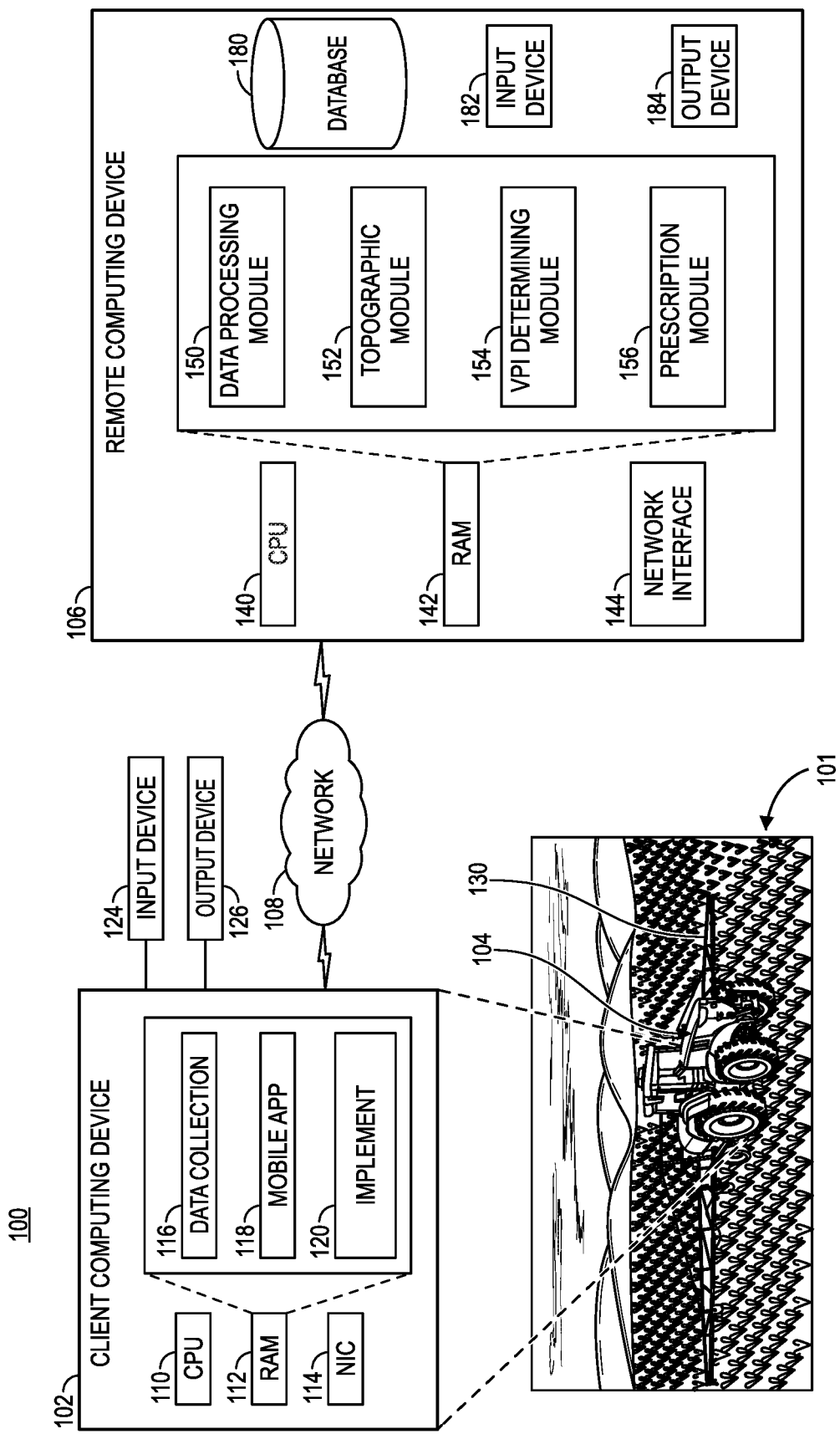
FIG. 1 depicts an example computing environment, according to an embodiment.
Figure 2:
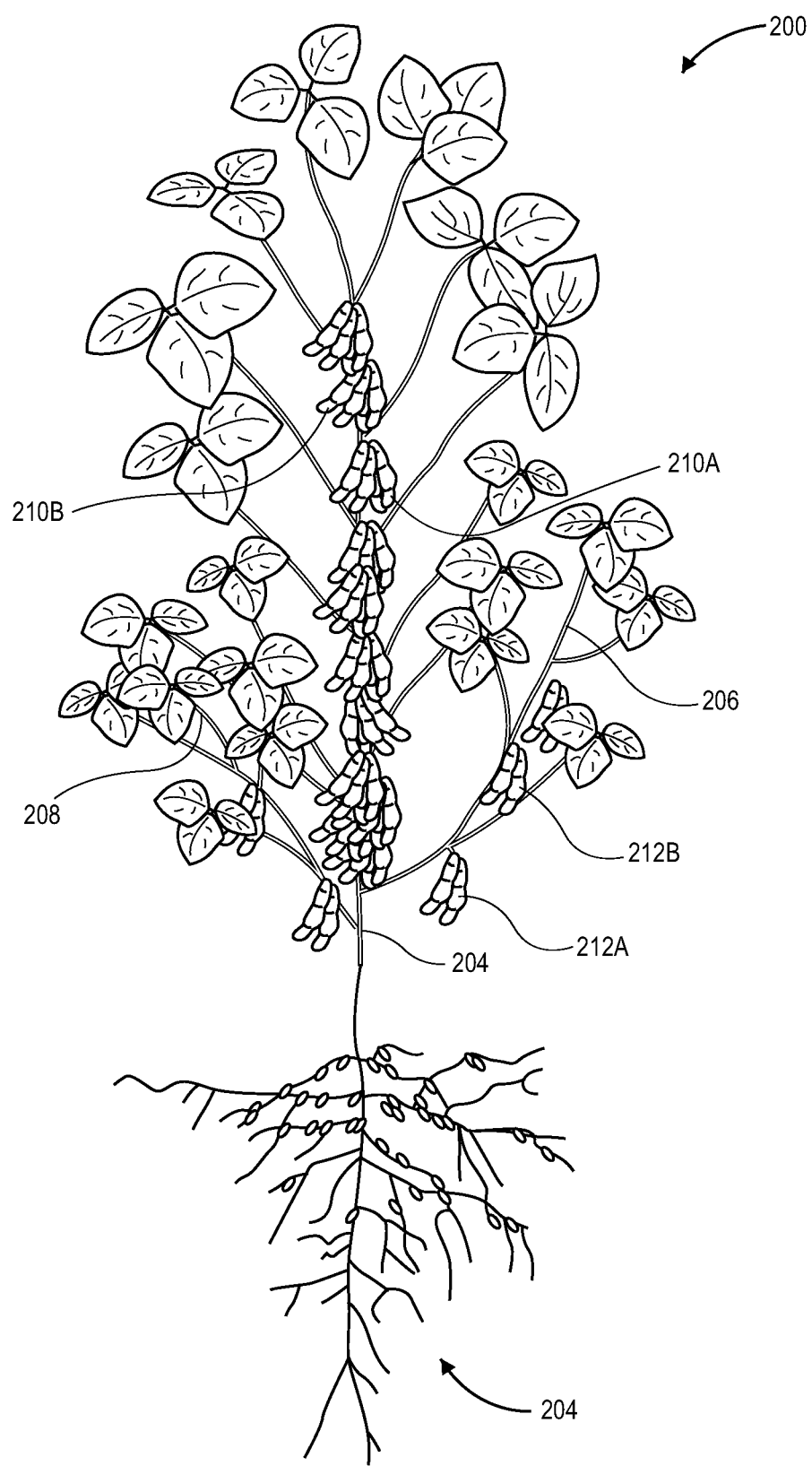
FIG. 2 depicts an example soybean plant.

FIG. 2 is a diagram of an example soybean plant 200 that may be one of the soybean plants 101 of FIG. 1. The soybean plant 200 of FIG. 2 has a root structure 202, a main stem or stalk 204, and two branches 206 and 208. Other soybean plants may have a different number (including zero) branches. The number and extent of the branches 206 (if any) determine the bushiness of the soybean plant 200. That is, the more branches and the larger the branches, the larger and more bushy the soybean plant. Pods of beans (two of which are designated at reference numerals 210A and 210B) will grow on the stalk 204, and pods of beans (two of which are designated at reference numerals 212A and 212B) will grow on the branches 206, 208.

A disclosed example objective characterization of the bushiness of a soybean plant is a variety profile index (VPI) value. A VPI value for a soybean plant may be computed as a ratio of branch bean weight and stem bean weight, where branch bean weight is the total weight of the beans associated with the branches of a soybean plant, and stem bean weight is the total weight of the beans associated with the stem of the soybean plant. Branch bean weight and stem bean weight may be measured in different ways, in embodiments. For example, a bean may be measured as associated with a stem or a respective branch when the pod in which it developed is attached to the stem or the respective branch. The VPI value for a soybean plant can be expressed mathematically as:

$$VPI = \text{total weight of beans associated with branches} / \text{total weight of beans associated with stem.}$$

In some embodiments, the present techniques compute a VPI value for a soybean plant via a process that includes 1) threshing the plant to separate the beans associated with the stem from the beans associated with the branches; 2) drying the stem and branch beans (if not already dried); 3) weighing the beans; and 4) computing the ratio of branch beans to stem beans. In some embodiments, this process may be a manual process and/or an automated process (e.g., a process that utilizes one or more farming implements). In some embodiments, the present techniques may include computing one or more VPI values using respective subsets of the beans from the soybean plant. For example, the present techniques may include computing a first VPI value of beans associated with a lower portion of the soybean plant (e.g., the beans from the roots of the soybean plant to the fifteenth above-ground node of the soybean plant). Such lower beans may be associated with earlier season growth. In some examples, multiple VPI values can be measured across a field or field subdivision (e.g., a hexagrid, as discussed below) and averaged.

The present techniques may include analyzing one or more computed VPI values to identify one or more respective soybean varieties (e.g., varieties having higher VPI values) with respect to one or more field or sub-field environments. For example, the present techniques may analyze VPI values of a field to determine one or more soybean varieties likely to develop branches in response to a higher yield environment. In some embodiments, the present techniques may analyze computed VPI values to determine management strategies (e.g., to determine a planting date, a plant population, a fungicide timing, an insecticide timing, etc.).

The present techniques include methods and systems for collecting machine data and for determining soybean characteristics (e.g., VPI values) within one or more agricultural fields by analyzing the machine data. In some embodiments, the soybean characteristics may be encoded in spatial data files encoded in a suitable file format, such as a commercial or open source shapefile, a GeoJSON format, a Geography Markup Language (GML) file, etc. Such spatial data files may include one or more layers (i.e., map layers, wherein each layer represents an agricultural characteristic (e.g., elevation, VPI values, etc.)). The individual layer(s) and/or files may be shared between multiple computing devices of an agricultural company, provided or sold to customers, stored in a database, etc.

Exemplary Computing Environment

FIG. 1 depicts an exemplary computing environment 100 in which the techniques disclosed herein may be implemented, according to embodiments.

The environment 100 includes a client computing device 102, an implement 104, a remote computing device 106, and a network 108. Some embodiments may include a plurality of client computing devices.

The client computing device 102 may be an individual server, a group (e.g., cluster) of multiple servers, or another suitable type of computing device or system (e.g., a collection of computing resources). For example, the client computing device 102 may be a mobile computing device (e.g., a server, a mobile computing device, a smart phone, a tablet, a laptop, a wearable device, etc.). In some embodiments the client computing device 102 may be a personal portable device of a user. In some embodiments the client computing device 102 may be temporarily or permanently coupled with the implement 104. The client computing device 102 may be the property of a customer, an agricultural analytics (or "agrilytics") company, an implement manufacturer, etc.

The client computing device 102 includes a processor 110, a memory 112 and a network interface controller (NIC) 114. The processor 110 may include any suitable number of processors and/or processor types, such as CPUs, one or more graphics processing units (GPUs), digital signal processor(s) (DSPs), etc. Generally, the processor 110 is configured to execute software instructions stored in a memory 112. The memory 112 may include one or more persistent memories (e.g., a hard drive/solid state memory) and stores one or more set of computer executable instructions/modules, including a data collection module 116, a mobile application module 118, and an implement control module 120, as described in more detail below. More or fewer modules may be included in some embodiments. The NIC 114 may include any suitable network interface controller (s), such as wired/wireless controllers (e.g., Ethernet controllers), and facilitate bidirectional/multiplexed networking over the network 108 between the client computing device 102 and other components of the environment 100 (e.g., another client computing device 102, the implement 104, the remote computing device 106, etc.). In some examples, the NIC 114 is external and communicatively coupled to the client computing device 102 as a peripheral device.

The one or more modules stored in the memory 112 may include respective sets of computer-executable instructions implementing specific functionality. For example, in an embodiment, the data collection module 116 includes a set of computer-executable instructions for collecting a machine data set from an implement (e.g., the implement 104). The data collection module 116 may include instructions for collecting an above-ground and/or below-ground soil sample.

The machine data collection module 116 may include a respective set of instructions for retrieving/receiving data from a plurality of different implements. For example, a first set of instructions may be for retrieving/receiving machine data from a first tractor manufacturer's products, while a second set of instructions is for retrieving/receiving machine data from a second tractor manufacturer's products. In another embodiment, the first and second set of instructions may be for, respectively, receiving/retrieving data from tillage equipment and a harvester. Of course, some libraries of instructions may be provided by the manufacturers of various implements and/or attachments, and may be loaded into the memory 112 and used by the data collection module 116. The data collection module 116 may retrieve/receive machine data from a separate hardware device (e.g., a client computing device 102 that is part of the implement 104) or directly from one or more of the sensors of the implement 104 and/or one or more of the attachments 130 coupled to the implement 104, if any.

The machine data may include any information generated by the client computing device 102, the implement 104 and/or the attachments 130. In some cases, the machine data may be retrieved/received via the remote computing device 106 (e.g., from a third-party cloud storage platform). For example, the machine data may include values generated via a soils laboratory or by analyzing a soil sample using a soil analysis attachment 130. The machine data may include sensor measurements of engine load data, fuel burn data, draft, fuel consumption, wheel slippage, etc. The machine data may include one or more time series, such that one or more measured values are represented in a single data set at a common interval (e.g., one-second). For example, the machine data may include a first time series of draft at a one-second interval, a second time series of wheel slippage, etc.

The machine data may be location-aware. For example, the client computing device 102 may add location metadata to the machine data, such that the machine data reflects an absolute and/or relative geographic position (i.e., location, coordinate, offset, heading, etc.) of the client computing device 102, the implement 104, and/or the attachments 130 within the agricultural field at the precise moment that the client computing device 102 captures the machine data. It will also be appreciated by those of ordinary skill in the art that some sensors and/or agricultural equipment may generate machine data that is received by the client computing device 102 already includes location metadata added by the sensors and/or agricultural equipment. In an embodiment wherein the machine data comprises a time series, each value of the time series may include a respective geographic metadata entry. It will be further appreciated by those of ordinary skill in the art that when the machine data is received from a historical archive, the machine data may include historical location data (e.g., the GPS coordinates corresponding to the location from which the historical machine data was captured).

The machine data collection module 116 may receive, access and/or retrieve the machine data via an API through a direct hardware interface (e.g., via one or more wires) and/or via a network interface (e.g., via the network 108). The data collection module 116 may collect (e.g., pull the machine data from a data source and/or receive machine data pushed by a data source) at a predetermined time interval. The time interval may be of any suitable duration (e.g., once per second, once or twice per minute, every 10 minutes, etc.). The time interval may be short, in some embodiments (e.g., once every 10 milliseconds). The data collection module 116 may include instructions for modifying and/or storing the machine data. For example, the data collection module 116 may parse the raw machine data into a data structure. The data collection module 116 may write the raw machine data onto a disk (e.g., a hard drive in the memory 112).

In some embodiments, the machine data collection module 116 may transfer the raw machine data, or modified machine data, to a remote computing system/device, such as the remote computing device 106. The transfer may, in some embodiments, take the form of an SQL insert command. In effect, the data collection module 116 performs the function of receiving, processing, storing, and/or transmitting the machine data. The data collection module 116 may receive (e.g., from a soil probe attachment) soil sample data corresponding to one or more points within the machine data.

The mobile application module 118 may include computer-executable instructions that display one or more graphical user interfaces (GUIs) on one or more output devices 126 and/or receive user input via one or more input devices 124. For example, the mobile application module 118 may correspond to a mobile computing application (e.g., an Android, iPhone, or other) computing application of an agrilytics company. The mobile computing application may be a specialized application corresponding to the type of computing device embodied by the client computing device 102. For example, in embodiments where the client computing device 102 is a mobile phone, the mobile application module 118 may correspond to a mobile application downloaded for the mobile phone. When the client computing device 102 is a tablet, the mobile application module 118 may correspond to an application with tablet-specific features. Exemplary GUIs that may be displayed by the mobile application module 118, and with which the user may interact, are discussed below.

The mobile application module 118 may include instructions for receiving/retrieving mobile application data from the remote computing device 106. In particular, the mobile application module 118 may include instructions for transmitting user-provided login credentials, receiving an indication of successful/unsuccessful authentication, and other functions related to the user's operation of the mobile application. The mobile application module 118 may include instructions for receiving/accessing/retrieving, rendering, and displaying visual maps in a GUI. Specifically, the application module 118 may include computer-executable instructions for displaying one or more map layers in the output device(s) 126 of the client computing device 102. The map layers may depict, for example, one or more clay types within an agricultural field.

The implement control module 120 includes computer-executable instructions for controlling the operation of an implement (e.g., the implement 104) and/or the attachments 130. The implement control module 120 may control the implement 104 while the implement 104 and/or attachments 130 are in motion (e.g., while the implement 104 and/or attachments 130 are being used in a farming capacity). For example, the implement control module 120 may include an instruction that, when executed by the processor 110 of the client computing device 102, causes the implement 104 to accelerate or decelerate, collect a soil sample using a soil probe, or change varieties on a planter.

In some embodiments, the implement control module 120 may cause one of the attachments 130 to raise or lower the disc arm of tillage equipment, or to apply more or less downward or upward pressure on the ground. In some embodiments, the implement control module 120 may control the attachments 130 in response to a predicted VPI value corresponding to the agricultural field where the implement 104 is positioned. Practically, the implement control module 120 has all of the control of the implement 104 and/or attachments 130 as does the human operator.

The implement control module 120 may include a respective set of instructions for controlling a plurality of implements. For example, a first set of instructions may be for controlling an implement of a first tractor manufacturer, while a second set of instructions is for controlling an implement of a second tractor manufacturer. In another embodiment, the first and second set of instructions may be for, respectively, controlling a tiller and a harvester. Of course, many configurations and uses are envisioned beyond those provided by way of example.

In some embodiments, the implement control module 120 may include computer-executable instructions for executing one or more agricultural prescriptions with respect to a field. For example, the control module 120 may execute an agricultural prescription that specifies, for a given agricultural field, a varying application rate of a chemical (e.g., a fertilizer, an herbicide, a pesticide, etc.) or a seed to apply at various points along the path based on the clay characteristics of the field. The control module 120 may analyze the current location of the implement 104 and/or the attachments 130 in real-time (i.e., as the control module 120 executes the agricultural prescription).

In some embodiments, one or more components of the computing device 102 may be embodied by one or more virtual instances (e.g., a cloud-based virtualization service). In such cases, one or more client computing device 102 may be included in a remote data center (e.g., a cloud computing environment, a public cloud, a private cloud, etc.). For example, a remote data storage module (not depicted) may remotely store data received/retrieved by the computing device 102. The client computing device 102 may be configured to communicate bidirectionally via the network 108 with the implement 104 and/or an attachment 130 that may be coupled to the implement 104. The implement 104 and/or the attachments 130 may be configured for bidirectional communication with the client computing device 102 via the network 108.

The client computing device 102 may receive/retrieve data (e.g., machine data) from the implement 104, and/or the client computing device 102 may transmit data (e.g., instructions) to the implement 104. The client computing device 102 may receive/retrieve data (e.g., machine data) from the attachments 130, and/or may transmit data (e.g., instructions) to the attachments 130. The implement 104 and the attachments 130 will now be described in further detail.

The implement 104 may be any suitable powered or unpowered equipment/machine or machinery, including without limitation: a tractor, a combine, a cultivator, a cultipacker, a plow, a harrow, a stripper, a tiller, a planter, a baler, a sprayer, an irrigator, a sorter, a harvester, etc. The implement 104 may include one or more sensors (not depicted) including one or more soil probe and the implement 104 may be coupled to one or more attachments 130. For example, the implement 104 may include one or more sensors for measuring respective implement values of engine load data, fuel burn data, draft sensing, fuel consumption, wheel slippage, etc. Many embodiments including more or fewer sensors measuring more or fewer implement values are envisioned. The implement 104 may be a gas/diesel, electric, or hybrid vehicle operated by a human operator and/or autonomously (e.g., as an autonomous/driverless agricultural vehicle).

The attachments 130 may be any suitable powered or unpowered equipment/machinery permanently or temporarily affixed/attached to the implement 104 by, for example, a hitch, yoke or other suitable mechanism. The attachments 130 may include any of the types of equipment that the implement 104 may comprise (e.g., field cultivator, disc, planter). The attachments 130 may include one or more sensors (not depicted) that may differ in number and/or type according to the respective type of the attachments 130 and the particular embodiment/scenario. For example, a tiller attachment 130 may include one or more soil coring probes. It should be appreciated that many attachments 130 sensor configurations are envisioned. For example, the attachments 130 may include one or more cameras. The attachments 130 may be connected to the implement 104 via wires or wirelessly, for both control and communications. For example, attachments 130 may be coupled to the client computing device 102 of the implement 104 via a wired and/or wireless interface for data transmission (e.g., IEEE 802.11, WiFi, Bluetooth®, universal serial bus (USB), etc.) and main/auxiliary control (e.g., 7-pin, 4-pin, etc.). The client computing device 102 may communicate bidirectionally (i.e., transmit data to, and/or receive data from) with the remote computing device 106 via the network 108.

The client computing device 102 includes the input device(s) 124 and output device(s) 126. The input device(s) 124 may include any suitable device or devices for receiving input, such as one or more microphone, one or more camera, a hardware keyboard, a hardware mouse, a capacitive touch screen, etc. The output device(s) 126 may include any suitable device for conveying output, such as a hardware speaker, a computer monitor, a touch screen, etc. In some cases, the input device(s) 124 and the output device(s) 126 may be integrated into a single device, such as a touch screen device that accepts user input and displays output. The client computing device 102 may be associated with (e.g., leased, owned, and/or operated by) an agrilytics company.

The network 108 may be a single communication network, or may include multiple communication networks of one or more types (e.g., one or more wired and/or wireless local area networks (LANs), and/or one or more wired and/or wireless wide area networks (WANs) such as the Internet). The network 108 may enable bidirectional communication between the client computing device 102 and the remote computing device 106, or between multiple client computing devices 102, for example.

The remote computing device 106 includes a processor 140, a memory 142, and a NIC 144. The processor 140 may include any suitable number of processors and/or processor types, such as CPUs and one or more graphics processing units (GPUs) or digital signal processors (DSPs). Generally, the processor 140 is configured to execute software instructions stored in the memory 142. The memory 142 may include one or more persistent memories (e.g., a hard drive/solid state memory) and stores one or more set of computer executable instructions/modules, as discussed below. For example, the remote computing device 106 may include a data processing module 150, a topographic module 152, a VPI determining module 154 and a prescription module 156. The NIC 144 may include any suitable network interface controller(s), such as wired/wireless controllers (e.g., Ethernet controllers), and facilitate bidirectional/multiplexed networking over the network 108 between the remote computing device 106 and other components of the environment 100 (e.g., another remote computing device 106, the client computing device 102, etc.).

The one or more modules stored in the memory 142 may include respective sets of computer-executable instructions implementing specific functionality. For example, in an embodiment, the data processing module 150 includes computer-executable instructions for receiving/retrieving data from the client computing device 102, the implement 104, and/or the attachments 130. For example, the data processing module 150 may include instructions that when executed by the processor 140, cause the remote computing device 106 to receive/access/retrieve machine data. The data processing module 150 may include further instructions for storing the machine data in one or more tables of the database 180. The data processing module 150 may store raw machine data, or processed data.

The data processing module 150 may include instructions for processing the raw machine data to generate processed data. For example, the processed data may be data that is represented using data types data of a programming language (e.g., R, C#, Python, JavaScript, etc.). The data processing module 150 may include instructions for validating the data types present in the processed data. For example, the data processing module 150 may verify that a value is present (i.e., not null) and is within a particular range or of a given size/structure. In some embodiments, the data processing module 150 may transmit processed data from the database 180 in response to a query, or request, from the client computing device 102. The data processing module 150 may transmit the processed data via HTTP or via another data transfer suitable protocol.

Figure 7:
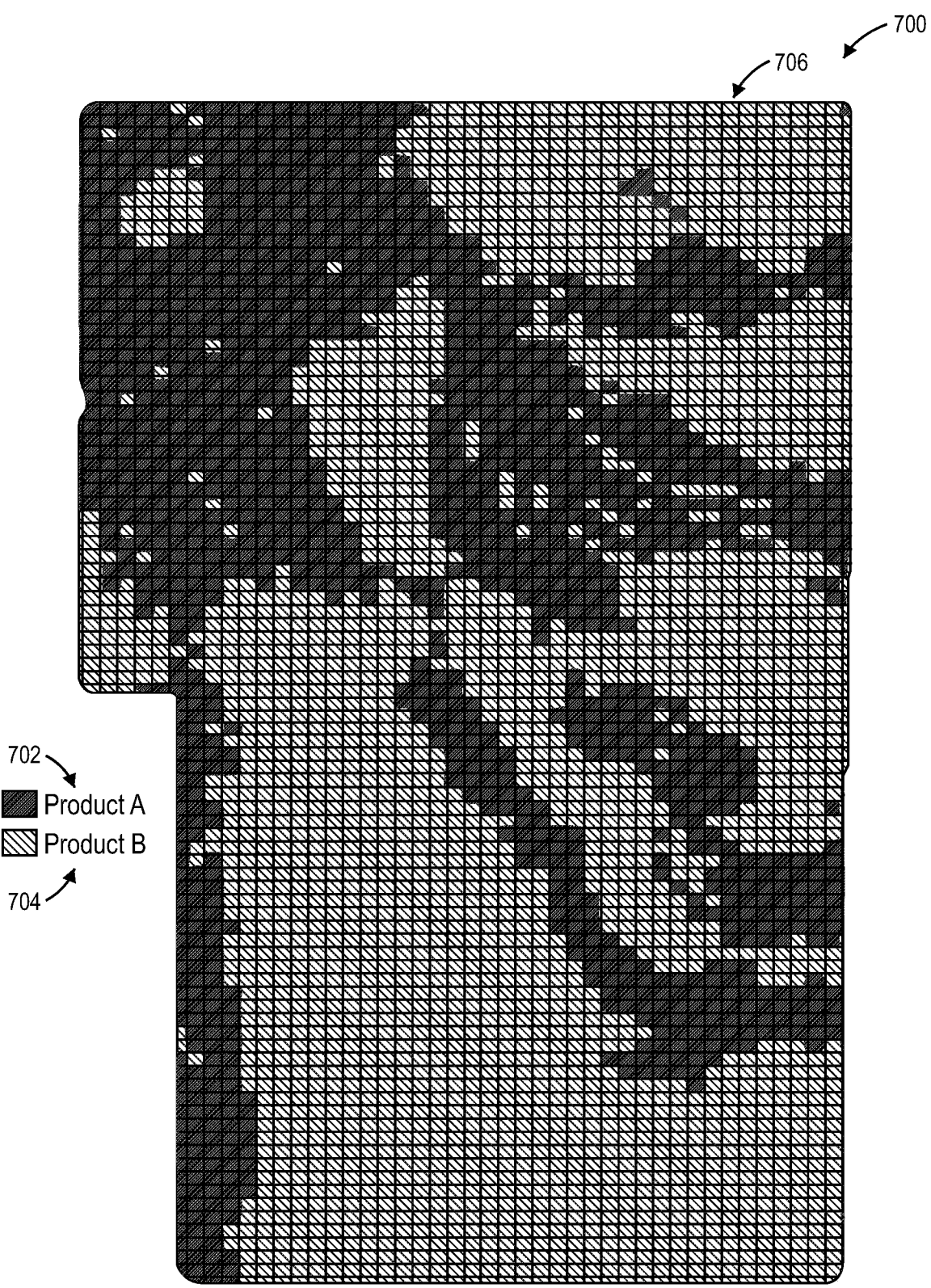
FIG. 7 depicts an exemplary multi-genetics prescription map, according to one embodiment and scenario.

For example, in an embodiment, the data processing module 150 of FIG. 1 may include a set of computer-executable instructions for analyzing remotely-sensed imagery (e.g., high-resolution visible and near-infrared (VNIR) imagery) to estimate plant physiological properties. The data processing module 150 may include further computer-executable instructions for analyzing the plant physiological properties to compute one or more VPI value predictions. Specifically, the data processing module 150 may include instructions for extracting one or more combinations of spectral bands (e.g., one or more vegetation indices, one or more derivative spectroscopy values, etc.) from the remotely-sensed imagery, and analyze the combinations of spectral bands to predict VPI values. In still further embodiments, the data processing module 150 may analyze soil data and/or topographic attributes (e.g., soil bulk density, SWI, CEC, OM, etc.) to predict one or more VPI values. The data processing module 150 may analyze these predicted VPI values to determine one or more environment-specific varietal responses, allowing for the development of multi-genetics planting recommendations (i.e., variety changes as the planter travels across the field) as depicted in FIG. 7, below.

The topographic module 152 may include instructions for retrieving, accessing and/or providing mapping data (e.g., electronic map layer objects) to other modules in the remote computing device 106. The mapping data may take the form of raw data. In some embodiments, the topographic module 152 may include spatial data files. The topographic module 152 may store mapping data in, and retrieve mapping data from, the database 180. The topographic module 152 may source elevation data from public sources, such as the United States Geological Survey (USGS) National Elevation Dataset (NED) database. In some embodiments, the data processing module 150 may provide raw data to the topographic module 152, wherein instructions within the topographic module 152 infer the elevation of a particular tract of land by analyzing the raw data. The elevation data may be stored in a two-dimensional (2D) or three-dimensional (3D) data format, depending on the embodiment and scenario.

Exemplary Variety Profile Index (VPI) Value Determination Embodiments

The VPI determining module 154 may process machine data to predict one or more VPI values corresponding to one or more subdivisions of an agricultural field or sub-field. In some embodiments, fields and sub-fields are divided into a grid of interlaced, hexagonal cells, called "hexagrids" herein. In some embodiments, the hexagrids are 8.5 meters across. In some embodiments, the VPI determining module 154 may process the machine data using a trained machine-learned (ML) model, as described with respect to FIG. 3.

Figure 3:
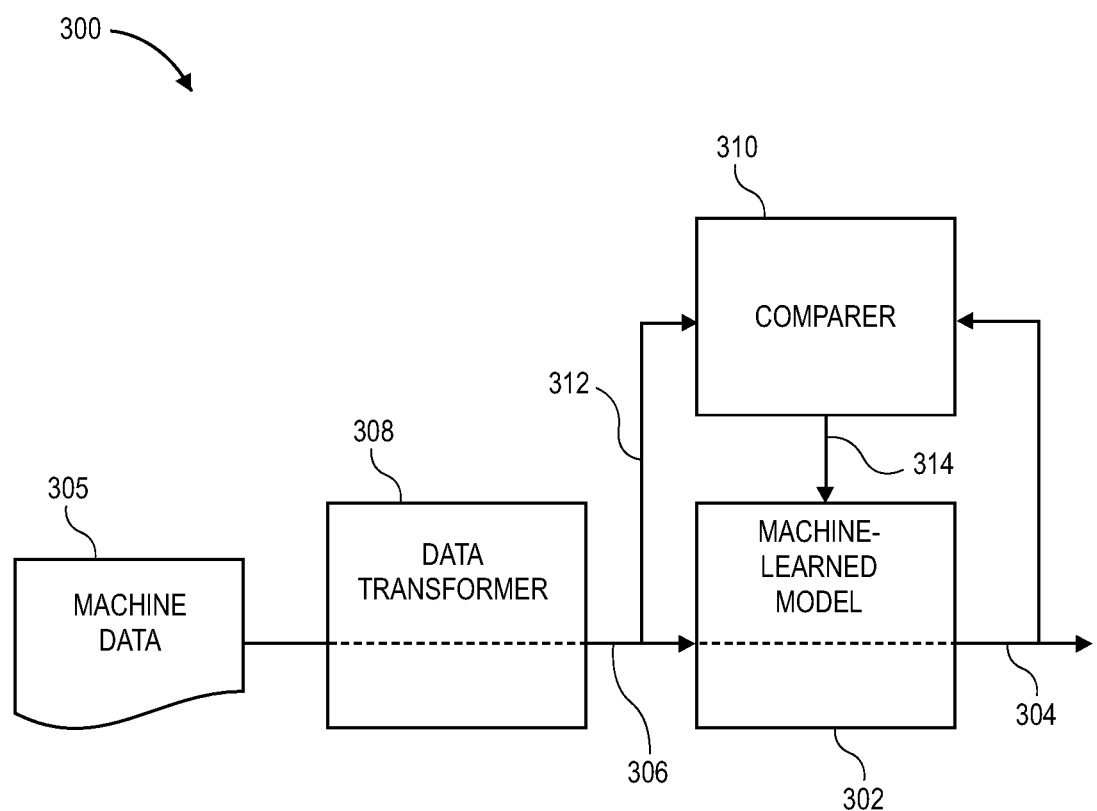
FIG. 3 is a block diagram illustrating an example implementation of the variety profile index determining module of FIG. 1, according to an embodiment.

Turning to FIG. 3, a block diagram of an example VPI determining module 300 is depicted. The VPI determining module 300 may correspond to the VPI determining module 154 of FIG. 1. The VPI determining module 300 may include instructions for training and operating one or more ML models 302 to predict one or more VPI values 304 corresponding to an agricultural field or sub-field based on input vectors of machine data 305 (e.g., data collected and/or processed by the data processing module 150) or values determined from the machine data 305 (e.g., an average, etc.). The ML model 302 may include a statistical model such as a multinomial logistic regression model, a decision tree, a gradient boosting model, a random forest model, a logistic regression model, etc. The predicted VPI values 304 may be associated with one or more hexagrids.

The block diagram includes a data transformer 308 that generates one or more input data vectors 306 for the ML model 302 by transforming the machine data 305. Specifically, the data transformer 308 may include instructions for processing the machine data 305 to generate input vectors 306 for the ML model 302. For example, computing averages, removing noise, unit conversions, computing a value of a first type from a value of a second type, computing a value or index based on one or more physical measurements, etc. An example input vector 306 for the ML model 302 includes one or more of soil topography, relative elevation, slope, latitude, growing season length, incident solar radiation, phosphorus fertility, potassium fertility, soil wetness index (SWI), organic matter, CEC, etc.

The machine data 305 may include image data (e.g., overhead imagery, visible imagery, near-infrared imagery, etc.), as discussed with respect to FIG. 7. When the machine data includes image data, the input vectors 306 may include biomass and/or leaf area values, as determined from the overhead imagery by the data transformer 308 and/or the data processing module 150. Examples of plant biomass may be values that describe a given plant's total dry mass, dry mass or specific components/organs (i.e., leaves, stems, roots), while leaf area quantifies the area of leaves that are actively photosynthesizing and producing carbohydrate. It should be noted by those skilled in the art that remotely sensed imagery, specifically visible-near-infrared (VNIR) imagery, is a good predictor of plant biomass, leaf area index and overall plant structure. The input vectors 306 may be labeled with the geographic coordinates of a respective hexagrid corresponding to the input values and, when known, respective VPI values determined using one or more plants located in the hexagrid. For example, a field may include a plurality of hexagrids, wherein each hexagrid includes a respective plurality of soybean plants. The present techniques may include determining a respective VPI value for each of the soybean plants, and assigning the respective VPI value to each respective plant.

The present techniques may determine the respective VPI value using a manual process and/or via an automated process. Specifically, one or more humans may manually thresh each soybean plant as described above, and enter the information into a computer, associating each threshed plant's VPI value with the machine data 305. In other embodiments, an implement may generate the machine data 305, wherein the generated machine data 305 includes point data including respective VPI values for each point in an agricultural field. In this way, the present techniques may analyze an individual field/sub-field (e.g., one or more hexagrids) to identify individual soybean plants, and the respective VPI value of each of the plants.

Returning to FIG. 3, the VPI determining module 300 may train the ML models 302 by implementing a comparator 310. When the VPI determining module 300 is training the ML models 302, the data transformer 308 may generate input data vectors 306 using the machine data 305 that include known VPI values 312 (e.g., wherein the VPI values 312 were manually determined, as described above). In this way, the machine data 305 may be said to be labeled data, and the data transformer 308 may preserve such labels when transforming the machine data 305. Specifically, each input data vector 306 may include a respective label corresponding to the VPI value of each respective input vector 306. The ML models 302 may process each vector of input data 306 to learn to predict the one or more VPI values 304.

In general, the present techniques may train the ML models 302 by, inter alia, establishing a network architecture, or topology, and adding one or more layers that may be associated with one or more respective activation functions (e.g., a rectified linear unit, softmax, etc.), loss functions and/or optimization functions. Multiple different types of artificial neural networks may be employed, including without limitation, recurrent neural networks, convolutional neural networks, and deep learning neural networks. Data sets used to train the artificial neural network(s) may be divided into training, validation, and testing subsets; these subsets may be encoded in an N-dimensional tensor, array, matrix, or other suitable data structures. Training may be performed by iteratively training the network using labeled training samples (e.g., training samples labeled using one or more observed/measured VPI values). Training of the artificial neural network may produce byproduct weights, or parameters which may be initialized to random values. The weights may be modified as the network is iteratively trained, by using one of several gradient descent algorithms, to reduce loss and to cause the values output by the network to converge to expected, or "learned", values.

In an embodiment, a regression neural network may be selected which lacks an activation function, wherein input data may be normalized by mean centering, to determine loss and quantify the accuracy of outputs. Such normalization may use a mean squared error loss function and mean absolute error. The artificial neural network model may be validated and cross-validated using standard techniques such as hold-out, K-fold, etc. In some embodiments, multiple artificial neural networks may be separately trained and operated, and/or separately trained and operated in conjunction. The ML models 302 may include instructions executed by a processor or a processing element using supervised or unsupervised machine learning, and the machine learning module may employ a neural network, which may be a convolutional neural network, a deep learning neural network, or a combined learning module or program that learns in two or more fields or areas of interest. Machine learning may involve identifying and recognizing patterns in existing data in order to facilitate making predictions for subsequent data. Models may be created based upon example inputs in order to make valid and reliable predictions for novel inputs. For example, a deep learning artificial neural network may be trained using historical machine data to generalize about previously unseen machine data. The ML models 302 may store one or more trained ML models in a memory and/or in an electronic database. The ML models 302 may transmit trained ML models to another component of the computing environment 100 (e.g., the client computing device 102).

In particular, the comparator 310 may compute differences 314 between the known VPI values 312 and the corresponding predicted VPI values 304, and the ML model 302 updates one or more of its parameters (e.g., coefficients, weights, etc.) based upon the VPI values 312 using, for example, predictive modeling. The comparator 310 may process may be repeated until a statistical measure (e.g., root mean square (rms), least squares, quadratic loss, etc.) of the differences 314 satisfies a predetermined threshold. The comparator 310 may use a gradient descent optimization algorithm to minimize the differences 314.

In operation, the VPI determining module 300 may be used to infer one or more VPI values of machine data for a field that was not used to train the VPI determining module 300. That is, the VPI determining module 300 may train the one or more ML models 302 using labeled data as described above. Next, machine data 305 corresponding to an agricultural field may be collected (e.g., using the implement 104 of FIG. 1). The machine data 305 may be transformed by the data transformer 308 to generate input vectors 306. The trained ML models 302 may process the input vectors 306 to determine one or more respective predicted VPI values 304.

Returning to FIG. 1, the prescription module 156 includes computer-executable instructions for generating one or more agricultural prescriptions. The agricultural prescriptions may be a set of computer-executable instructions for performing one or more agricultural interventions with respect to an agricultural field. For example, the agricultural prescription may include one more map layers specifying a respective set of interventions relating to seeding, fertilization, tillage, etc. The client computing device 102 may receive/retrieve the prescription instructions, and execute them.

The prescription module 156 may include generating one or more agricultural prescriptions, or scripts. The agricultural prescriptions may include computer-executable instructions for causing an implement (e.g., the implement 104) to perform one or more tasks (e.g., instruct a planter to switch from product A to product B). In some embodiments, the prescription may include instructions for performing the tasks in response to a clay type at a location within a given field. For example, the implement control module 120 may analyze a field map layer received from the topographic module 152 and a clay map layer. The implement control module 120 may execute the prescription. The prescription may include instructions causing the implement 104 to perform the task in a predetermined way (e.g., plant seeds at a specific rate) when 1) the location of the implement 104 coincides with a minimum VPI value; and 2) the location of the implement 104 coincides with a particular field, as determined by reference to the field map layer. In this way, the prescription module 156 may generate prescriptions executable by a client device for modifying a soil to include, for example, more of a given macronutrient (e.g., potassium).

The prescription module 156 may be generated by a suitable tool. For example, in some embodiments, the remote computing device 106 may include a further module that allows the user to specify the number of years desired to build soil potassium to a critical/target level. The prescription module 156 may include instructions for calculating, based on the target rate and the current rate as seen in the machine data, an amount of macronutrient to apply to cause the soil to reach the target value.

The remote computing device 106 may further include one or more databases 180, one or more input devices 182, and one or more output devices 184. The database 180 may be implemented as a relational database management system (RDBMS) in some embodiments. For example, the database 180 may include one or more structured query language (SQL) databases, a NoSQL database, a flat file storage system, or any other suitable data storage system/configuration. In general, the database 180 allows the client computing device 102 and/or the remote computing device 106 to create, retrieve, update, and/or retrieve records relating to performance of the techniques herein. For example, the database 180 may allow the client computing device 102 to store information received from one or more sensors of the implement 104 and/or the attachments 130. The database 180 may include a Lightweight Directory Access Protocol (LDAP) directory, in some embodiments. The client computing device 102 may include a module (not depicted) including a set of instructions for querying an RDBMS, an LDAP server, etc. For example, the client computing device 102 may include a set of database drivers for accessing the database 180 of the remote computing device 106. In some embodiments, the database 180 may be located remotely from the remote computing device 106, in which case the remote computing device 106 may access the database 180 via the NIC 114 and the network 108.

The input device(s) 182 may include any suitable device or devices for receiving input, such as one or more microphones, one or more cameras, a hardware keyboard, a hardware mouse, a capacitive touch screen, etc. The input device(s) 182 may allow a user (e.g., a system administrator) to enter commands and/or input into the remote computing device 106, and to view the result of any such commands/input in the output device(s) 184. For example, an employee of the agrilytics company may use the input device 182 to adjust parameters with respect to one or more agricultural fields for applying macronutrients via a prescription.

The output device(s) 184 may include any suitable device for conveying output, such as a hardware speaker, a computer monitor, a touch screen, etc. The remote computing device 106 may be associated with (e.g., leased, owned, and/or operated by) an agrilytics company. As noted above, the remote computing device 106 may be implemented using one or more virtualization and/or cloud computing services. One or more application programming interfaces (APIs) may be accessible by the remote computing device 106.

In operation, the agrilytics company may access the remote computing device 106 to establish one or more field records on behalf of one or more growers. For example, the company may store the field records in the database, wherein each grower is associated with a unique identifier (e.g., a universally unique identifier (UUID)) as are each of the grower's respective fields. For example, the grower may be associated with the grower's fields in the database via a one-to-many relationship.

The agrilytics company may populate the database 180 with machine data corresponding to the grower's fields by using the implement 104 to drive the fields and collect the machine data. The machine data may include information gathered from an attachment 130 (e.g., a soil probe) and/or machine data collected from other sources. The agrilytics company may additionally populate the database 180 with VPI values corresponding to the grower's fields by sampling and threshing soybean plants, as described above. Once the machine data and VPI values for the grower's fields have been collected, the VPI determining module 154 may process the machine data to determine predicted VPI values. The VPI values may be assigned to one or more hexagrids within the field.

The prescription module 156 may include instructions that analyze the VPI values of the field and determine one or more treatments for affecting portions of the field. For example, the prescription module 156 may be pre-programmed to switch soybean varieties when specific environmental characteristics (i.e., soil, topography) change within a hexagrid or combination of hexagrids. The instructions for switching soybean varieties may vary based on the predicted VPI values of the hexagrid. It should be appreciated that the examples provided are intentionally simplified for explanation, and many further embodiments are envisioned, as described below.

Exemplary Computer-Implemented Methods

Figure 4:
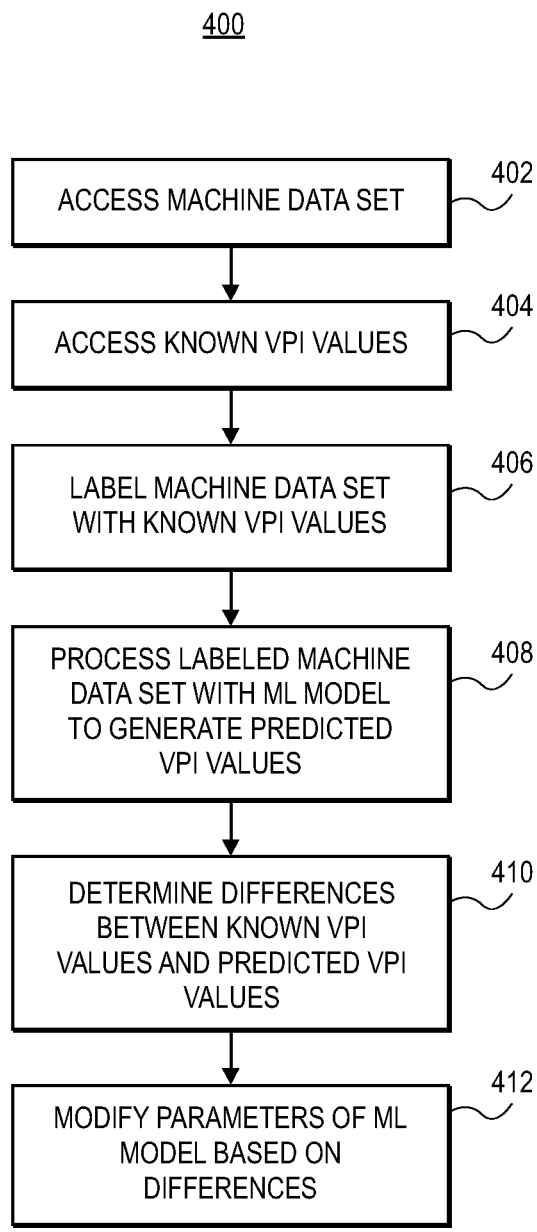
FIG. 4 is a flow diagram of an example computer-implemented method for training a machine-learned model for predicting VPI values within an agricultural field, according to an embodiment.

FIG. 4 depicts a flow diagram of an example computer-implemented method 400 for training a ML model to predict one or more VPI values within an agricultural field, according to one embodiment. The method 400 may be implemented as an executable program or portion of an executable program for execution by a processor such as the processor 110, 140 of FIG. 1. The program may be embodied in software and/or machine-readable instructions stored on a non-transitory, machine-readable storage medium such as a compact disc (CD), hard disk drive (HDD), digital versatile disk (DVD), Blu-ray disk, cache, flash memory, read-only memory (ROM), random access memory (RAM), or any other storage device or storage disk associated with the processor 110, 140 in which information may be stored for any duration (e.g., for extended time periods, permanently, for brief instances, for temporarily buffering, and/or for caching of the information). The order of execution of the blocks of FIG. 4 may be changed, and/or some of the blocks described may be changed, eliminated, or combined. Additionally, or alternatively, any or all of the blocks may be implemented by one or more of a hardware circuit (e.g., discrete and/or integrated analog and/or digital circuitry), application specific integrated circuit (ASIC), programmable logic device (PLD), field programmable gate array (FPGA), field programmable logic device (FPLD), logic circuit, etc. structured to perform the corresponding operation(s) without executing software or instructions.

The method 400 may include accessing a machine data set corresponding to the agricultural field (block 402). The machine data set may include labeled data corresponding to the agricultural field (e.g., one or more measurements taken using a soil probe corresponding to soil values). The soil probe may include manual, hydraulic and/or electronic aspects, in some embodiments and scenarios. Specifically, the implement 104 may collect machine data using the soil probe. In some embodiments, the collected machine data set may include historical machine data collected previously. The historical machine data may be collected by the implement 104 or another process/actor, in some embodiments. The machine data may include data collected from multiple mechanisms (e.g., from farm equipment, from one or more soil probes, and/or other sources). The method 400 may include accessing known VPI values corresponding to the agricultural field (block 404). For example, the method 400 may access a respective VPI value for each of a plurality of soil samples.

In some embodiments, the method 400 may include labeling the machine data with the known VPI values (block 406). The method 400 may include processing the labeled machine data with the ML model 302 to train one or more ML models to generate predicted VPI values corresponding to the known VPI values (block 408). The method 400 may include computing differences between the known VPI values and the predicted VPI values (block 410). The method 400 may include updating one or more parameters (e.g., coefficients, weights, etc.) of the ML model 302 based upon the differences (block 412). The method 400 may include repeating blocks 408-412 until a statistical measure (e.g., rms, least squares, etc.) of the differences 314 satisfies a predetermined threshold. The method 400 may include storing the trained ML models and/or the weights/parameters of each of the respective trained ML models in a non-transitory memory and/or an electronic database for later use (e.g., to predict one or more VPI values corresponding to an agricultural field, an agricultural sub-field, a hexagrid, etc.).

Figure 5:
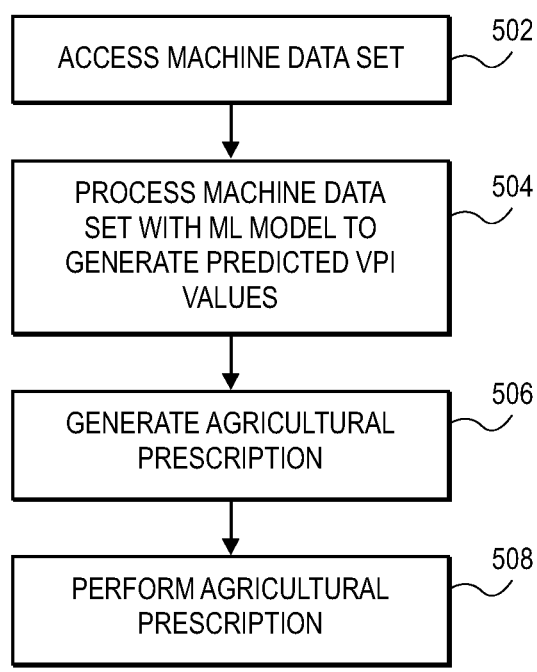
FIG. 5 is a flow diagram of an example computer-implemented method for improving agricultural treatment application within an agricultural field, according to an embodiment.

FIG. 5 depicts a flow diagram of an example computer-implemented method 500 for improving agricultural treatment application within an agricultural field, according to one embodiment and scenario. The method 500 may be implemented using an executable program or portion of an executable program for execution by a processor such as the processor 110, 140 of FIG. 1. The program may be embodied in software and/or machine-readable instructions stored on a non-transitory, machine-readable storage medium such as a CD, HDD, DVD, Blu-ray disk, cache, flash memory, ROM, RAM, or any other storage device or storage disk associated with the processor 110, 140 in which information may be stored for any duration (e.g., for extended time periods, permanently, for brief instances, for temporarily buffering, and/or for caching of the information). The order of execution of the blocks of FIG. 5 may be changed, and/or some of the blocks described may be changed, eliminated, or combined. Additionally, or alternatively, any or all of the blocks may be implemented by one or more of a hardware circuit (e.g., discrete and/or integrated analog and/or digital circuitry), ASIC, PLD, FPGA, FPLD, logic circuit, etc. structured to perform the corresponding operation(s) without executing software or instructions.

The method 500 may include collecting a machine data set corresponding to the agricultural field (block 502). The machine data set corresponding to the agricultural field may include one or more measurements taken using a soil probe. The soil probe may include manual, hydraulic and/or electronic aspects, in some embodiments and scenarios. Specifically, an implement (e.g., the implement 104 of FIG. 1) may collect a plurality of measurements corresponding to data points within the agricultural field using the soil probe. The implement 104 may transmit the collected measurements as machine data to the remote computing device 106 of FIG. 1, as described herein. In some embodiments, the collected machine data set may include historical machine data collected previously. The historical machine data may be collected by the implement 104 or another process/actor, in some embodiments. The machine data may include data collected from multiple mechanisms (e.g., from farm equipment, from one or more soil probes, and/or other sources).

The method 500 may include analyzing the machine data set with the one or more trained ML models 302 to predict one or more VPI values corresponding to one or more respective hexagrids located within the agricultural field (block 504). As noted above, the collection and analysis of machine data may be performed by the client computing device 102 and/or the remote computing device 106. In either case, the method 500 may annotate each data point within the machine data with a geographic position. The geographic position of each point may be added to the machine data upon collection by an implement and/or a computing device (e.g., by an onboard Global Positioning System (GPS) device of the implement 104 or the client computing device 106).

The method 500 may associate each hexagrid with the determined VPI values, such that once the method 500 has been completed, each of the hexagrids within the field includes one or more respective VPI values corresponding to the individual soybean plants and/or varieties located within that hexagrid. In this way, the grower, field manager, trusted advisor or other relevant party can advantageously gain an objective understanding of how different regions of the field are influencing VPI (e.g., by viewing a field map layer showing respective VPI values for the field). The ability to view differing VPI values is advantageous for practical growing purposes. For example, a grower operating the implement 104 of FIG. 1 may view the field map layer including VPI values and initiate prescriptive fungicide applications in areas where soybean plants are more likely to have additional growth (e.g., have higher VPI values) in connection with a higher yield environment.

As discussed above, the method 500 may include generating and transmitting (e.g., from the remote computing device 106) one or more map layers via the network 108 for display in the client computing device 106. The one or more map layers may include the predicted VPI values, in some embodiments. In still further embodiments, the present techniques may be used, optionally in conjunction with other non-VPI characteristics map layers, to automate the application of agricultural treatments. For example, the method 500 may include generating an agricultural prescription for the agricultural field, including at least one treatment based on the VPI values (block 506). An example prescription includes variety selection, seeding rate, field planting priority, in season management including fertility (e.g., macro or micronutrients spread or foliar sprayed), crop protection (e.g., fungicide, insecticide), biologicals, etc.

However, the present techniques represent a further advantageous improvement over conventional techniques that require the grower to maintain constant attention during the laborious planting and harvest seasons, which may be further challenging due to hot/cold weather, precipitation and, in many cases, working in darkness. To that end, the method 500 may include performing the generated agricultural prescription by, for example, transmitting the prescription in the form of an electronic prescription file to the client computing device 102 for execution in the implement control module 120 (block 508). The agricultural prescription may include sets of instructions for automatically applying a treatment in portions of the field that correspond with certain VPI values.

The agricultural prescription may access a location module (e.g., a GPS module) of the client computing device 102 to determine the real-time position of the implement within the field, with respect to the field map layer associated with VPI values information. The agricultural prescription may include instructions for causing a pre-determined agricultural treatment to be applied to the field, for example by accessing an attachment (e.g., the attachment 130 of FIG. 1). In this way, the present techniques may be advantageously used to identify VPI values corresponding a field, which may be highly variable for the reasons discussed above. The present techniques may further advantageously be used to automatically apply treatment product based on the VPI values, to conserve product while increasing yields.

Exemplary Variety Profile Index (VPI) Visualization Embodiments

In still further embodiments, the predicted VPI values for the field may be analyzed to generate one or more visualizations for comparing the potential effects of applying various agricultural products to the agricultural field. Specifically, in some embodiments, the data processing module 150 of FIG. 1 may include instructions for generating one or more visualizations (e.g., a chart, a graphic, a webpage, etc.) depicting the predicted VPI values generated by the trained ML models of the VPI determining module 154.

Figure 6A:
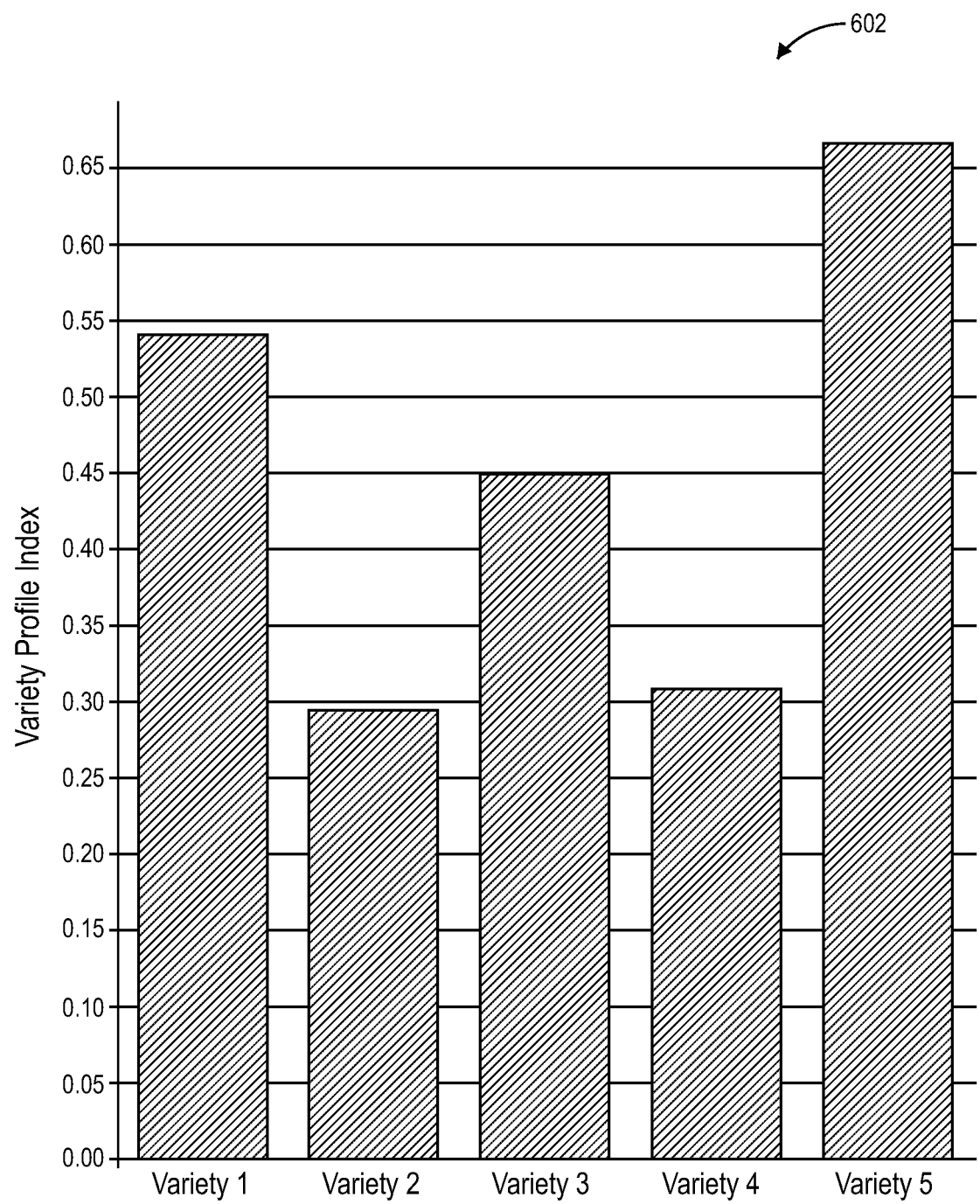
FIG. 6A depicts an example chart for visualizing yield performance among products having differing variety profile indices, according to an embodiment.

FIG. 6A depicts an example chart 602 for visualizing yield performance among products having differing variety profile indices, according to an embodiment. The chart 602 includes a horizontal axis depicting a plurality of different agricultural varieties (e.g., soybean seeds). The vertical axis depicts a measure of each variety's computed VPI. The values for each variety are plotted in the chart, enabling the grower, field manager, etc. to intuitively and advantageously grasp, at a glance, each variety's respective ability to benefit from a higher yield environment. In particular, those varieties having a higher VPI are more likely to benefit from a high yield environment, whereas those with a lower VPI are not. The ability to compute and visualize VPI values in this manner, with respect to different varieties, advantageously enables key decision-makers to reference objective data when making product recommendations.

Figure 6B:
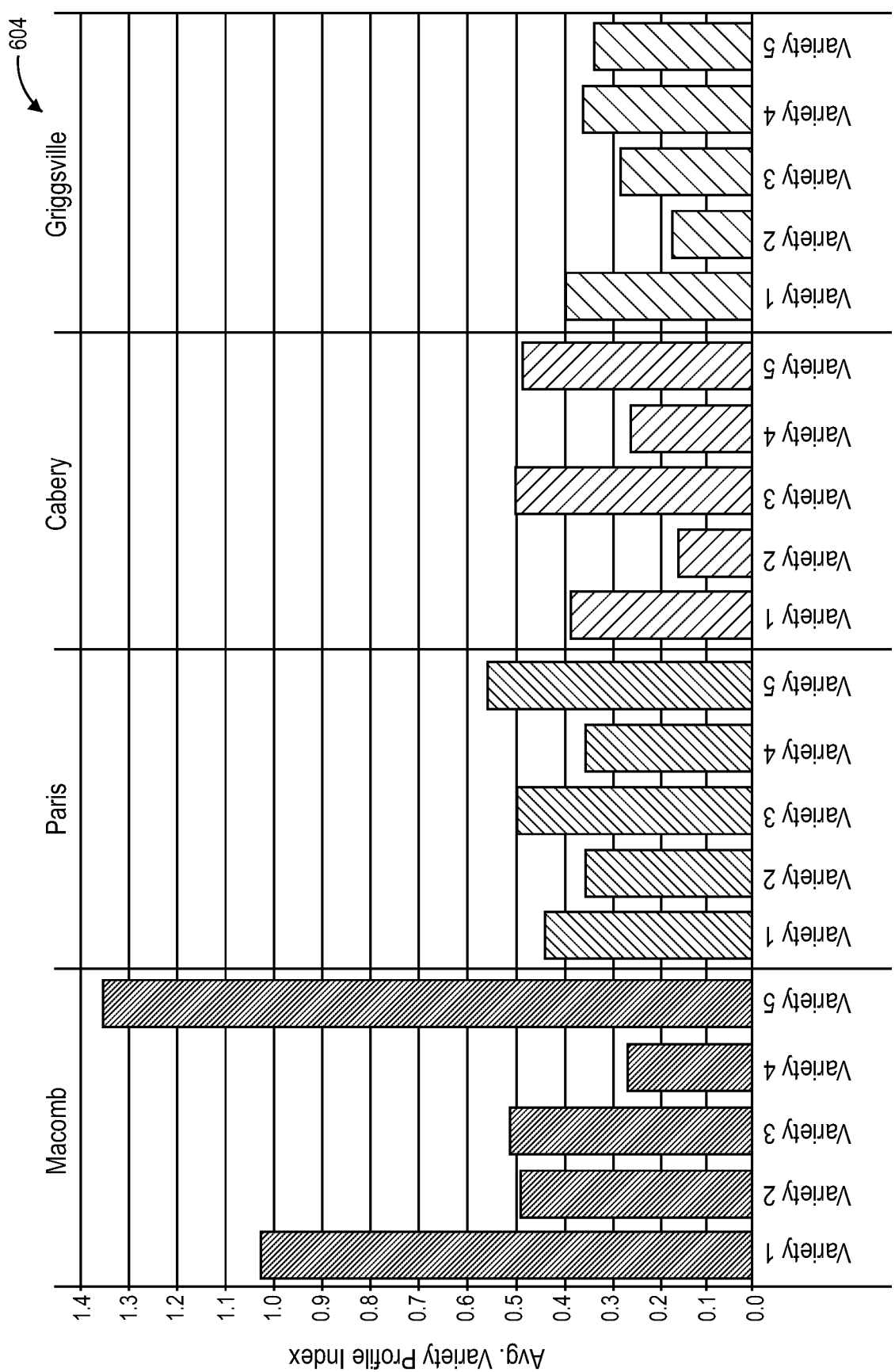
FIG. 6B depicts an example chart for visualizing average variety profile indices across products among different fields, according to an embodiment.

FIG. 6B depicts an example chart 604 for visualizing average variety profile indices across products among different fields, according to an embodiment. In particular, the chart 604 depicts the respective performance of five varieties in four separate fields. The chart 604 advantageously enables the grower, field manager, etc. to intuitively and advantageously grasp, at a glance, each variety's respective performance among different fields, and to determine the extent to which VPI is consistent across varying locations. Based on the information in the chart 604, the trusted advisor, for example, may recommend planting of a variety, such as Variety 1, that consistently performs at or above a baseline VPI of 0.4. Of course, the chart 604 is intentionally simplified for explanation, and may include other/less data; fewer/more fields; and/or different ranges of VPI values, in some embodiments and scenarios.

Figure 6C:
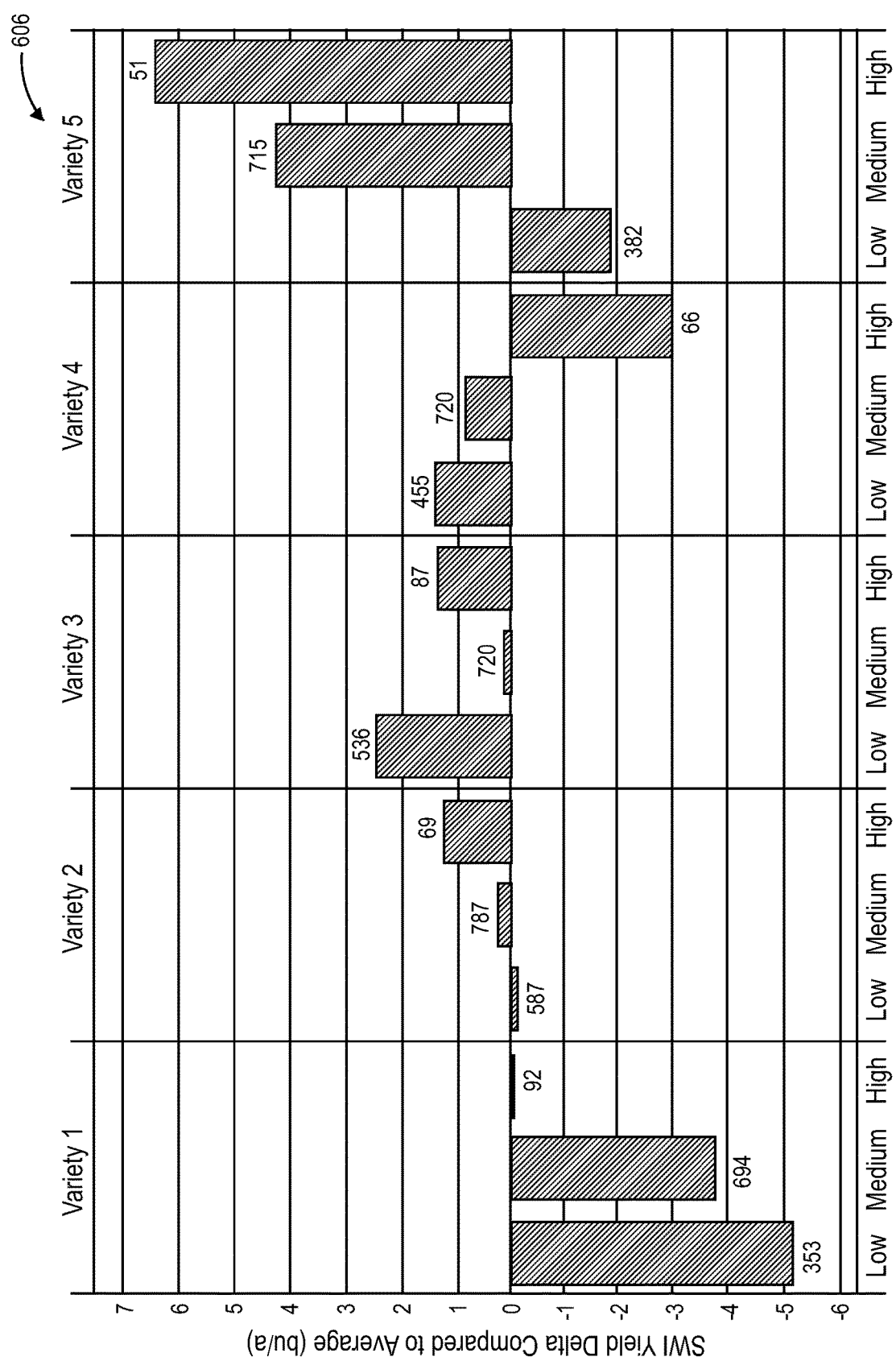
FIG. 6C depicts an example chart for visualizing soil wetness index data compared to average yield among different products, according to an embodiment.

FIG. 6C depicts an example chart 606 for visualizing soil wetness index (SWI) data compared to average yield among different products, according to an embodiment. The chart 606 is an example of a chart that a trusted advisor, for example, may provide to a customer in conjunction with information related to VPI values for certain products. Specifically, the chart 606 includes a top horizontal axis specifying a plurality of agricultural varieties. The chart 606 includes a vertical axis depicting the change in SWI yield as compared to an average. For each product, the change in yield is plotted for low, medium and high SWI. The chart 606 enables the trusted advisor, for example, to communicate the effect of SWI on yield across different products. In some embodiments, the data in the chart 606 may be combined/cross-referenced with data, such that for a given product, a composite value of SWI information and VPI values are provided for a given agricultural product. In some embodiments, the present techniques may base an agricultural prescription and/or a field management recommendation on this composite value.

Figure 6D:
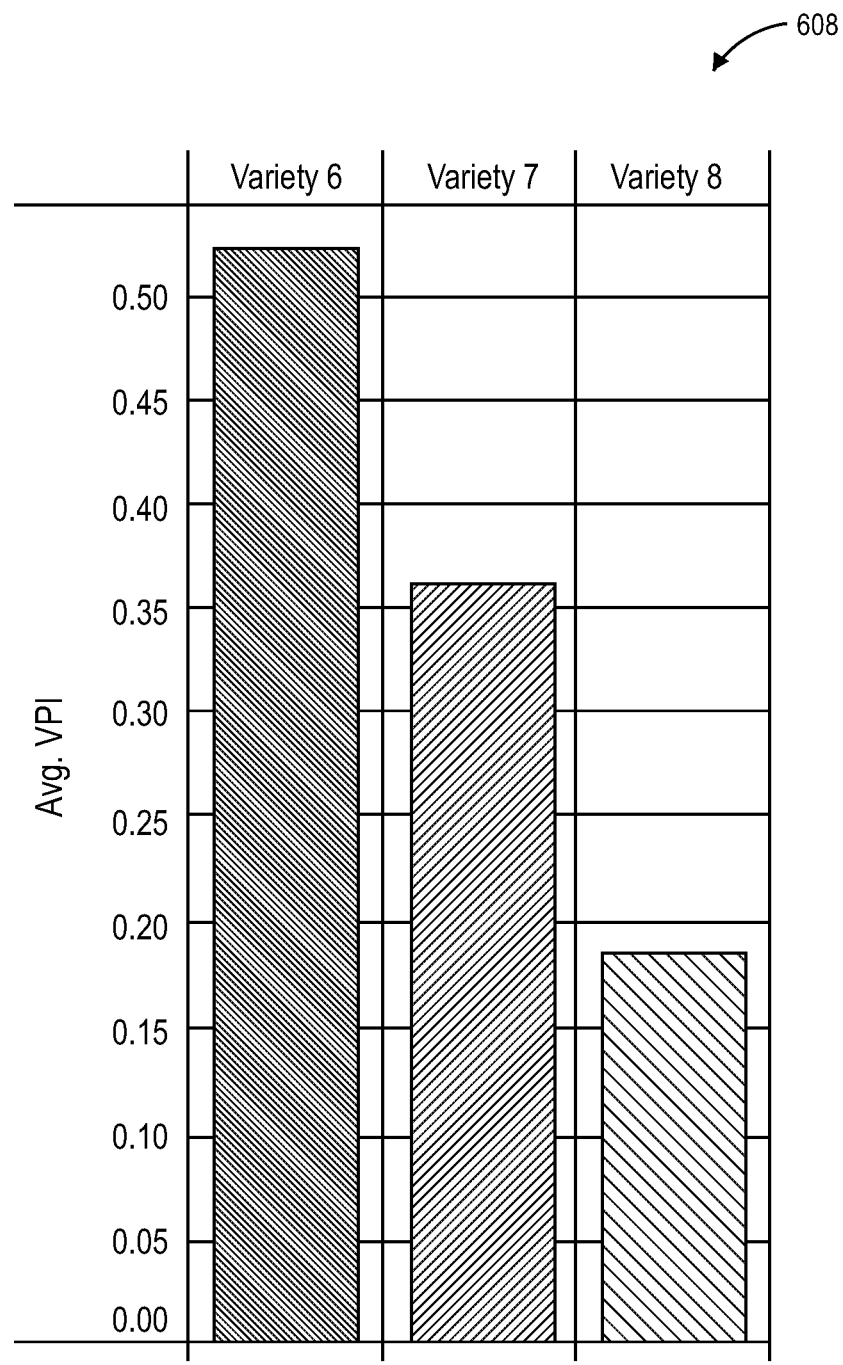
FIG. 6D depicts an example chart for visualizing average variety profile index for a plurality of agricultural varieties, according to an embodiment.

FIG. 6D depicts an example chart 608 for visualizing a respective average variety profile index for a plurality of agricultural varieties, according to an embodiment. The chart 608 enables the grower to rapidly determine the suitability of each variety. For example, the viewer may determine that a VPI value of greater than 0.4 indicates performance in higher yielding environment as with Variety 6. The viewer may determine that a VPI value of below 0.4 requires specific variety placement as in the example of Variety 7. The viewer may determine that Variety 8, at a VPI value of 0.2, is a better fit for a stress environment, and will likely respond with higher yields given an increase in plant population.

Figure 6E:
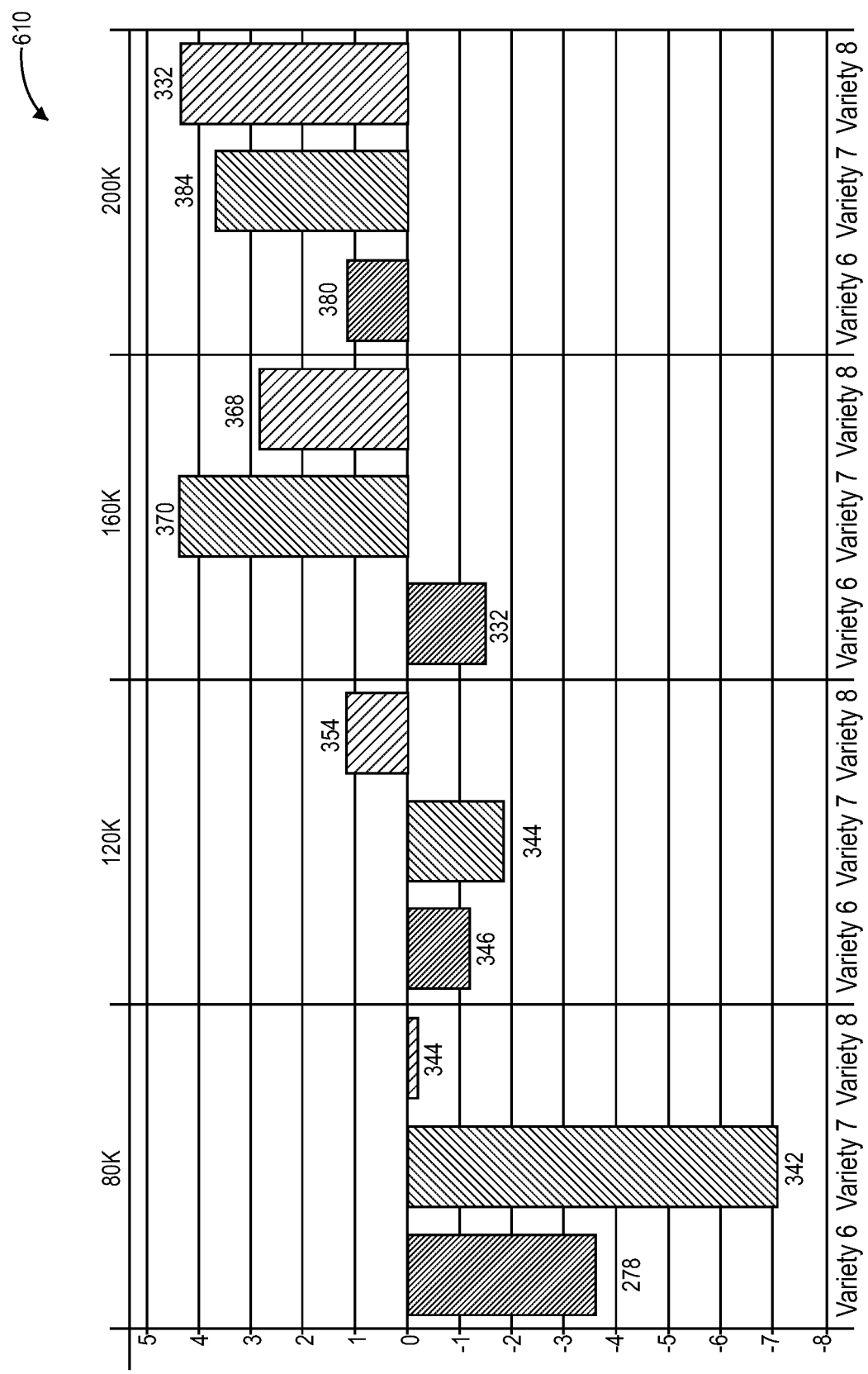
FIG. 6E depicts an example chart for visualizing yields according to plant population among a plurality of agricultural varieties, according to an embodiment.

FIG. 6E depicts an example chart 610 for visualizing yields according to plant population among a plurality of agricultural varieties, according to an embodiment. The chart 610 includes a top horizontal axis depicting a plurality of respective plant population, and for each plant population, a bottom horizontal axis listing a plurality of agricultural products. The VPI of each product is depicted in the chart 610. By viewing the chart 610, the trusted advisor, grower, customer, etc. is advantageously able to determine, instantly and intuitively, the respective performance of products given different population conditions. For example, the viewer can quickly determine that lower VPI products generally have a stronger response to population, and that increasing population may lead to an increase or a decrease in yield, depending on which variety is selected.

In general, the charts 6A-6E advantageously provide decision-makers in all areas of precision agriculture with the tools to quantify information related to variety performance among different fields, different environments. The visualization techniques herein enable fast and easy visualization and communication of quantified information to other parties, thus improving field management computing systems. For example, the field advisor need not base product recommendations to a field owner with an intuition, an anecdote or a best guess regarding variety performance.

FIG. 7 depicts an exemplary multi-genetics prescription map 700, according to an embodiment. The map 700 includes a first product coding 702 and a second product coding 704. The first product coding 702 and the second product coding 704 are depicted within respective cells of a map layer 706. The cells of the map layer 706 may be color-coded using the first product coding 702 and the second product coding 704 to indicate cells wherein the respective product will be applied. For example, the product coding 702 and the product coding 704 may be two respective soybean varieties determined using the techniques described herein. The topographic module 152 of FIG. 1 may generate the map layer 706 to include a plurality of predicted VPI values each corresponding to a respective field subdivision (e.g., a respective hexagrid) of the map layer 706. In some embodiments, the map layer 706 may be used as a visual tool prior to and/or during the planting process.

ADDITIONAL CONSIDERATIONS

The following considerations also apply to the foregoing discussion. Throughout this specification, plural instances may implement operations or structures described as a single instance. Although individual operations of one or more methods are illustrated and described as separate operations, one or more of the individual operations may be performed concurrently, and nothing requires that the operations be performed in the order illustrated. These and other variations, modifications, additions, and improvements fall within the scope of the subject matter herein.

It should also be understood that, unless a term is expressly defined in this patent using the sentence "As used herein, the term" "is hereby defined to mean . . . " or a similar sentence, there is no intent to limit the meaning of that term, either expressly or by implication, beyond its plain or ordinary meaning, and such term should not be interpreted to be limited in scope based on any statement made in any section of this patent (other than the language of the claims). To the extent that any term recited in the claims at the end of this patent is referred to in this patent in a manner consistent with a single meaning, that is done for sake of clarity only so as to not confuse the reader, and it is not intended that such claim term be limited, by implication or otherwise, to that single meaning.

Unless a claim element is defined by reciting the word "means" and a function without the recital of any structure, it is not intended that the scope of any claim element be interpreted based on the application of 35 U.S.C. § 112(f).

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present). As used herein, the phrase "at least one of A and B" is intended to refer to any combination or subset of A and B such as (1) at least one A, (2) at least one B, and (3) at least one A and at least one B. Similarly, the phrase "at least one of A or B" is intended to refer to any combination or subset of A and B such as (1) at least one A, (2) at least one B, and (3) at least one A and at least one B.

In addition, use of "a" or "an" is employed to describe elements and components of the embodiments herein. This is done merely for convenience and to give a general sense of the invention. This description should be read to include one or at least one and the singular also includes the plural unless it is obvious that it is meant otherwise.

Further, as used herein, the expressions "in communication," "coupled" and "connected," including variations thereof, encompasses direct communication and/or indirect communication through one or more intermediary components, and does not require direct mechanical or physical (e.g., wired) communication and/or constant communication, but rather additionally includes selective communication at periodic intervals, scheduled intervals, aperiodic intervals, and/or one-time events. The embodiments are not limited in this context.

Upon reading this disclosure, those of ordinary skill in the art will appreciate still additional alternative structural and functional designs for implementing the concepts disclosed herein, through the principles disclosed herein. Thus, while particular embodiments and applications have been illustrated and described, it is to be understood that the disclosed embodiments are not limited to the precise construction and components disclosed herein. Various modifications, changes and variations, which will be apparent to those of ordinary skill in the art, may be made in the arrangement, operation and details of the method and apparatus disclosed herein without departing from the spirit and scope defined in the appended claims.

What is claimed:

1. A computing system for training a machine learning model to characterize soybean plants, the computing system comprising:
   one or more processors; and
   one or more non-transitory, computer-readable media including instructions that, when executed by the one or more processors, cause the computing system to:
   receive a machine data set corresponding to an agricultural field;
   process the machine data set with a trained machine-learned model to generate one or more predicted variety profile index values, the trained machine-learned model trained using labeled data including a ratio of at least one measured branch bean weight to at least one measured stem bean weight; and cause a visualization based on the predicted variety profile index values to be displayed on a graphical user interface of a computing device.

2. The computing system of claim 1, the one or more non-transitory computer-readable media including instructions that, when executed by the one or more processors, cause the computing system to:

generate the visualization, wherein the visualization includes respective yield performance among products having differing variety profile indices.

3. The computing system of claim 1, the one or more non-transitory computer-readable media including instructions that, when executed by the one or more processors, cause the computing system to:

generate the visualization, wherein the visualization includes respective average variety profile indices across products among different fields.

4. The computing system of claim 1, the one or more non-transitory computer-readable media including instructions that, when executed by the one or more processors, cause the computing system to:

generate the visualization, wherein the visualization includes respective soil wetness index data compared to average yield for a plurality of varieties.

5. The computing system of claim 1, the one or more non-transitory computer-readable media including instructions that, when executed by the one or more processors, cause the computing system to:

generate the visualization, wherein the visualization includes respective average variety profile indices for a plurality of varieties.

6. The computing system of claim 1, the one or more non-transitory computer-readable media including instructions that, when executed by the one or more processors, cause the computing system to:

generate the visualization, wherein the visualization includes respective yields according to plant populations among a plurality of agricultural varieties.

7. The computing system of claim 1, the one or more non-transitory computer-readable media including instructions that, when executed by the one or more processors, cause the computing system to:

generate the visualization, wherein the visualization includes a multi-genetics prescription map layer including a plurality of predicted variety profile index values each corresponding to a respective field subdivision of the map layer.

8. A computer-implemented method for training a machine learning model to characterize soybean plants, the method comprising:

receiving a machine data set corresponding to an agricultural field;

processing the machine data set with a trained machine-learned model to generate one or more predicted variety profile index values, the trained machine-learned model trained using labeled data including a ratio of at least one measured branch bean weight to at least one measured stem bean weight; and causing a visualization based on the predicted variety profile index values to be displayed on a graphical user interface of a computing device.

9. The method of claim 8, further comprising:

generating the visualization, wherein the visualization includes respective yield performance among products having differing variety profile indices.

10. The method of claim 8, further comprising:

generating the visualization, wherein the visualization includes respective average variety profile indices across products among different fields.

11. The method of claim 8, further comprising:

generating the visualization, wherein the visualization includes respective soil wetness index data compared to average yield for a plurality of varieties.

12. The method of claim 8, further comprising:

generating the visualization, wherein the visualization includes respective average variety profile indices for a plurality of varieties.

13. The method of claim 8, further comprising:

generating the visualization, wherein the visualization includes respective yields according to plant populations among a plurality of agricultural varieties.

14. The method of claim 8, further comprising:

generating the visualization, wherein the visualization includes a multi-genetics prescription map layer including a plurality of predicted variety profile index values each corresponding to a respective field subdivision of the map layer.

15. A non-transitory computer-readable medium having stored thereon computer-executable instructions that, when executed by one or more processors, cause a computer to:

receive a machine data set corresponding to an agricultural field;

process the machine data set with a trained machine-learned model to generate one or more predicted variety profile index values, the trained machine-learned model trained using labeled data including a ratio of at least one measured branch bean weight to at least one measured stem bean weight; and cause a visualization based on the predicted variety profile index values to be displayed on a graphical user interface of a computing device.

16. The non-transitory computer-readable medium of claim 15, having stored thereon further computer-executable instructions that, when executed by one or more processors, cause a computer to:

generate the visualization, wherein the visualization includes respective yield performance among products having differing variety profile indices.

17. The non-transitory computer-readable medium of claim 15, having stored thereon further computer-executable instructions that, when executed by one or more processors, cause a computer to:

generate the visualization, wherein the visualization includes respective soil wetness index data compared to average yield for a plurality of varieties.

18. The non-transitory computer-readable medium of claim 15, having stored thereon further computer-executable instructions that, when executed by one or more processors, cause a computer to:

generate the visualization, wherein the visualization includes respective average variety profile indices for a plurality of varieties.

19. The non-transitory computer-readable medium of claim 15, having stored thereon further computer-executable instructions that, when executed by one or more processors, cause a computer to:

generate the visualization, wherein the visualization includes respective yields according to plant populations among a plurality of agricultural varieties.

20. The non-transitory computer-readable medium of claim 15, having stored thereon further computer-executable instructions that, when executed by one or more processors, cause a computer to:

generate the visualization, wherein the visualization includes a multi-genetics prescription map layer including a plurality of predicted variety profile index values each corresponding to a respective field subdivision of the map layer.

* * * * *